Nov. 30, 1965          J. W. MILLER                3,220,515
                   BRAKE SHOE GUIDE MECHANISM
                    Filed Dec. 20, 1963
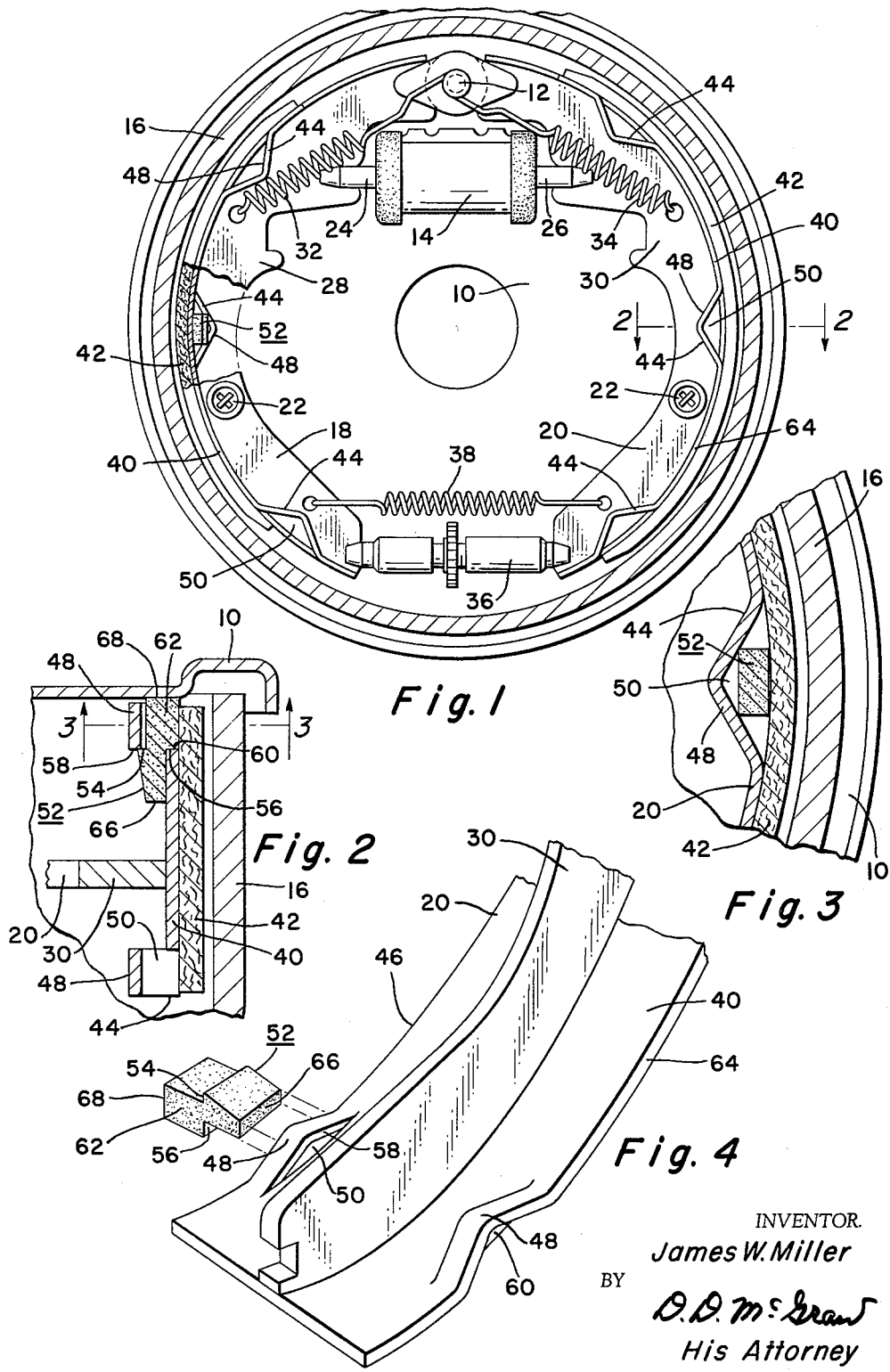
INVENTOR.
James W. Miller
BY
D.D. McGrant
His Attorney

United States Patent Office 3,220,515
Patented Nov. 30, 1965

3,220,515
BRAKE SHOE GUIDE MECHANISM
James W. Miller, Dayton, Ohio, assignor to General Motors Corporation, Detroit, Mich., a corporation of Delaware
Filed Dec. 20, 1963, Ser. No. 332,011
3 Claims. (Cl. 188—78)

The invention relates to a brake shoe guide and support mechanism and more particularly to such a mechanism in which the brake shoes are maintained in proper alignment with the brake backing plate during their apply and release movements.

It has been common practice in the brake industry to provide a backing plate with embossed pads extending inwardly toward the brake shoes and engageable with the adjacent edge surfaces of the shoe rims so that the shoes are aligned with the wheel cylinder plungers and the brake drum in their movements relative to the backing plate. Hold-down springs resiliently attach the shoes to the backing plate and hold them against the embossed pads. Consequently, as the brake shoes are applied and retracted and, in duo-servo brakes, moved circumferentially, the shoe rims ride on the pads in a frictional surface engaging relationship.

In order to insure proper shoe engagement with the pads, lance sections are struck out of the shoe rims so that they are located in alignment with the pads during all of the brake shoe movements. The use of such pads and lance sections permits the alignment of the shoes in a planar manner without requiring the entire edge surfaces of the rims to be in contact with the backing plate. The consequent decrease in surface area decreases the frictional forces and permits more controlled movement of the brake shoes than would otherwise occur.

As the shoes are used over a considerable period of time, however, wear often occurs to the pads or to the shoe rims, or both, resulting, for example, in grooving and scoring of the pads. The metal-to-metal contact also often causes objectionable noises to be generated. The grooved or scored backing plate pads hamper the movement of the shoes and this in turn reduces the efficiency of the brake and in some instances causes brake malfunction.

In accordance with the invention, it is now proposed to reduce the friction between the shoe and the backing plate by providing a low surface friction, good wearing element which can be economically attached to either the backing plate or the shoe rim. Such an element must be able to provide continuous low surface friction characteristics which are substantially less than the friction characteristics of the metal-to-metal contact of earlier designs, must be able to withstand the temperature differentials occurring in brake assemblies, must be readily removable and replaceable, must be held in place during the entire period of installation and use without attention, and must substantially reduce or eliminate noises which are generated by relatively movable elements in this area. The invention is herein disclosed as being embodied in a brake shoe support and spacing member which is installed in the aperture created by the lance section currently utilized in brake shoe design. The physical characteristics of the lance section are utilized in combination with desirable support member configurations to provide for permanent retention of the support member to the shoe while permitting its removal and replacement when necessary. Such removal and replacement may commonly be made when the brake lining is replaced due to normal wear, although the support member may be of such a material that its replacement is not required even at this time.

In some instances it may be desirable to fasten the support member to the backing plate by suitable fastening means, locating the support member at the same point at which an embossed pad is currently located. As illustrated in the drawing, however, the preferred construction provides for mounting the support member on the brake shoe. In this manner the spacing between the brake shoe and the backing plate can be provided to any desired minimum without endangering accidental removal of the support member should it be worn over a long period of operation.

It is within the purview of the invention to manufacture the support member as a briquette or as an extruded member. The exact configuration of the support member can be adapted to various lance forms or shapes by simply changing the briquette or extruded length of the support member without changing the shoe support die. By utilizing the currently provided lance sections for retention of the support member, no modifications need be made to the brake shoe to compensate for provision of the support member. By making the support member of material having good wear characteristics, it may be utilized with backing plates currently having embossed pads by designing the support member to extend a minimal distance beyond the shoe rim edge surface, and this spacing can be maintained for long periods of operation. Brake assemblies embodying the invention have the advantages of overall simplicity, adaptability to current production brake elements, low cost, and positive means of retention. Depending upon the particular circumstances, the support member may be made of powdered metal, a suitable plastic such as nylon or Teflon, and, for example, in the case of a sintered material, may be impregnated with oil or other lubricant having high temperature stability qualities to aid in reducing the surface friction between the support member and the backing plate.

In the drawing:

FIGURE 1 is a side elevation of a brake assembly embodying the invention with parts being broken away and in section.

FIGURE 2 is a partial section view of a detailed portion of FIGURE 1 taken in the direction of arrows 2—2 of that figure.

FIGURE 3 is a partial section view with parts broken away taken in the direction of arrows 3—3 of FIGURE 2.

FIGURE 4 is a perspective view illustrating a shoe web and rim with a support and guide member in position to be installed before the brake lining is secured to the shoe rim.

The brake assembly of FIGURE 1 is illustrated as being of the duo-servo type, although the invention may be embodied in other types of brake assemblies wherein one or more brake shoes are movable relative to the brake shoe backing plate. The backing plate or brake shoe support member 10 is suitably secured to a non-rotating portion of a vehicle, as is well known in the art. An anchor pin 12 and the housing of a wheel cylinder 14 are secured to the backing plate. The brake drum 16 is mounted on a rotatable wheel in any suitable manner. The primary brake shoe 18 and the secondary brake shoe 20 are mounted on the backing plate 10 by means of hold-down spring assemblies 22 so that the shoes are resiliently movable on backing plate 10 while being urged toward the backing plate. The wheel cylinder 14 has plungers 24 and 26 which are suitably engageable with the shoe webs 28 and 30, respectively. The upper ends of the shoe webs are engageable with the anchor pin 12, and are normally held against the anchor pin in the brake released position by the brake shoe retraction springs 32 and 34, as is common in the art. The lower ends of the shoes are in engagement with the adjuster mechanism 36 and held against the ends of the mechanism 36 by the spring 38, also in a manner well known in the art.

Each shoe is of generally similar construction insofar as the present invention is concerned. Each shoe is provided with an arcuate rim 40, suitably secured to the web 28 or 30, on which a brake lining 42 is in turn secured. In the manufacture of the brake shoes, lance sections 44 are struck out of the rim 40 adjacent the rim edges at appropriate positions along the rim so that they may engage embossed pads suitably formed on the backing plate, in accordance with current brake construction practice. No such embossed pads are illustrated on the backing plate 10, however, since they are not necessary when utilizing structure embodying the invention. It is to be understood that such pads may be present in some instances, and that their presence or absence in no way affects the operation of assemblies embodying the invention.

Each lance section 44 is illustrated as being struck radially inwardly from an edge surface 46 of a rim 40 so that they provide a lance bridge 48 which, with the adjacent portion of the rim 40, defines a lance aperture 50. It is normal brake shoe manufacturing practice to provide lance sections 44 on both sides of the brake shoes so that the shoes are usable on left and right wheels. Only the lance sections on the shoe side adjacent the backing plate function in any one installation.

The improvement in the brake assembly with which the invention is concerned includes the provision of a shoe support member or plug 52 installed through the lance aperture 50 and retained in place by oppositely disposed support member shoulder 54 and 56. Shoulder 54, in the particular construction illustrated, engages the inner edge surface 58 of the lance bridge 48, and shoulder 56 engages the outer surface 60 provided on the edge of the rim 40 after the lance section 44 has been struck therefrom. The body 62 of the support member 52 extends through the aperture 50 and laterally outward beyond the edge surface 64 of the rim 40 an amount dependent upon the spacing desired between the brake shoe edge and the backing plate. This amount may be minimal, particularly when the support member 52 is utilized in an installation already having embossed pads provided on the backing plate 10. In installations originally designed to utilize a support member, the backing plate pad embossing operation can be eliminated, and the body 62 of the support member may be laterally extended somewhat further to provide the required spacing. This is the particular construction shown in the drawing. The inner portion of the body section 52 may be deeper as shown at 66 so that it can be easily inserted through the aperture 50 before the lining 42 is attached to the outer surface of the rim 40. When the lining is so attached, it may engage a substantially flat surface of the support member body 62 and hold it tightly against the adjacent surface of the lance bridge 48.

The support member 52 may have various forms and shapes depending upon the particular construction of the lance sections 44. While other fastening methods may be utilized, the particular fastening construction herein disclosed provides for quick installation and removal at the same time that the brake lining is being installed or replaced. The force of the hold-down spring assembly 22 will keep the outer surface 68 of member 52 in engagement with the adjacent surface of the backing plate 10. Since the support member 52 is formed of a material having a low surface friction characteristic, the friction loads are considerably reduced. Also, the material is generally of a softer material than that of the backing plate so that the backing plate is not scored or grooved after long periods of brake operation. Thus structure embodying the invention eliminates several objectionable features of brake constructions in accordance with current practice and provides low cost, and simple and adaptable arrangements. The support member 52 may be formed in any of several manners, such as extrusion, molding or briquetting. When the support member is formed of a porous metal, it may be lubricated with a lubricant so as to further reduce the friction.

In the claims:

1. A brake shoe assembly comprising, a shoe rim having a struck out lance section from an edge thereof and a friction lining secured to said rim and cooperating with said lance section adjacent the rim edge to provide a lance passage, a low friction shoe support and guide member having a retention section provided with a first shoulder engaging said lance section on one edge and a second shoulder engaging said rim in said lance passage and a body section extending through said lance passage and outwardly beyond said rim and said lining for spacing and guiding said shoe assembly relative to a shoe support member.

2. A low surface friction member for attachment to a brake shoe rim through a lance formed therein and comprising a first section and a second section laterally offset from said first section to provide retention and locating shoulders in a common plane on opposite sides thereof, and connecting means disposed between said first and second sections defining said common plane.

3. A brake assembly comprising; a shoe assembly support member; a shoe assembly movably mounted on said support member and including, an arcuate shoe rim having an lining-receiving outer surface and edge surfaces and a lining received on and secured to said outer surface, said rim having a lance section including a bridge struck radially inwardly from said outer surface to define a bridge aperture in said rim, and a low surface friction member; said low surface friction member having retention shoulders extending from opposite surfaces thereof and received through said aperture with one of said shoulders engaging said lance section bridge and the other of said shoulders engaging said rim at the edge surface thereof from which said lance section bridge was struck to retain said low surface friction member on said shoe rim, said low surface friction member extending laterally beyond the edge surface of said rim and said lining and in engaging relation with said shoe assembly support member in low surface friction relation.

References Cited by the Examiner

UNITED STATES PATENTS 3,115,219  12/1963  Birge _____ 188—78

FOREIGN PATENTS 782,795  9/1957  Great Britain.

MILTON BUCHLER, *Primary Examiner.*

RALPH D. BLAKESLEE, ARTHUR L. LA POINT,
*Examiners.*